No. 806,080. PATENTED NOV. 28, 1905.
G. L. GLASER & J. OLSEN.
VEHICLE WHEEL.
APPLICATION FILED DEC. 19, 1904.
2 SHEETS—SHEET 1.
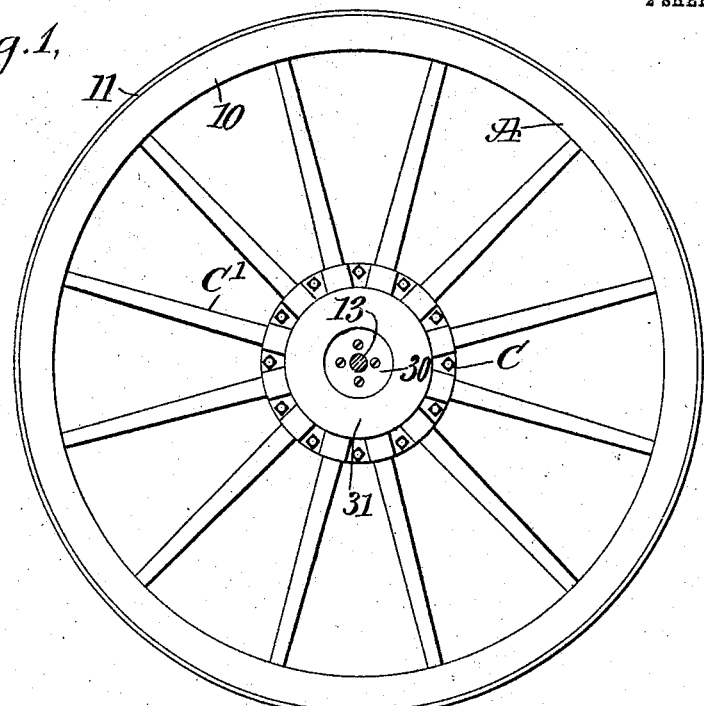
Fig.1,
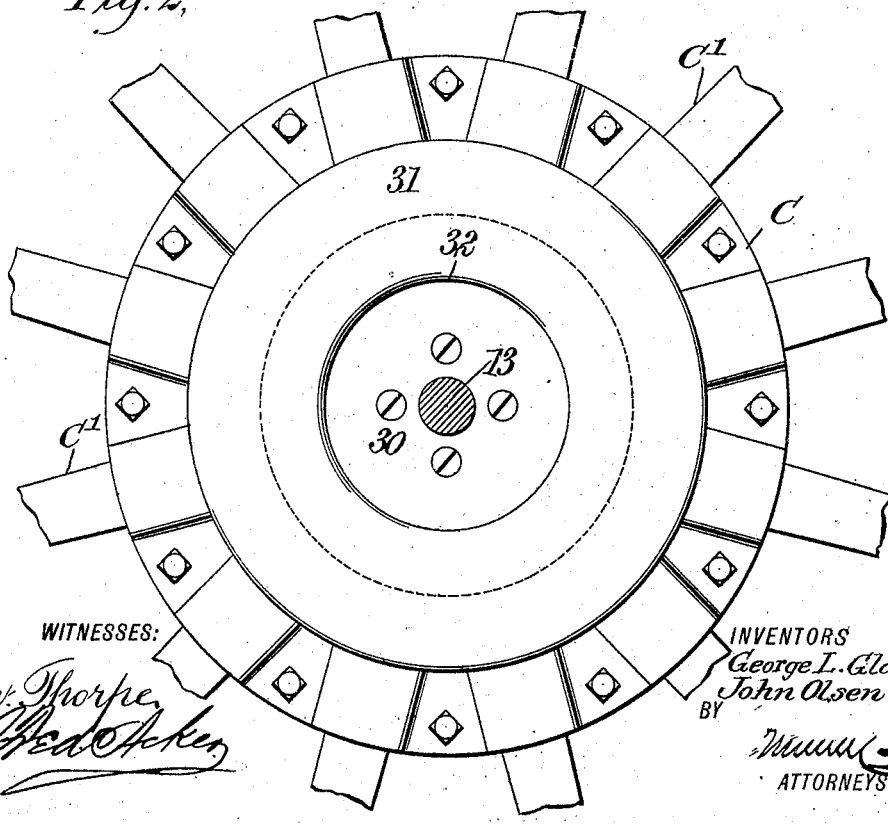
Fig.2,
WITNESSES:
Edw. Thorpe
INVENTORS
George L. Glaser
John Olsen
BY
ATTORNEYS

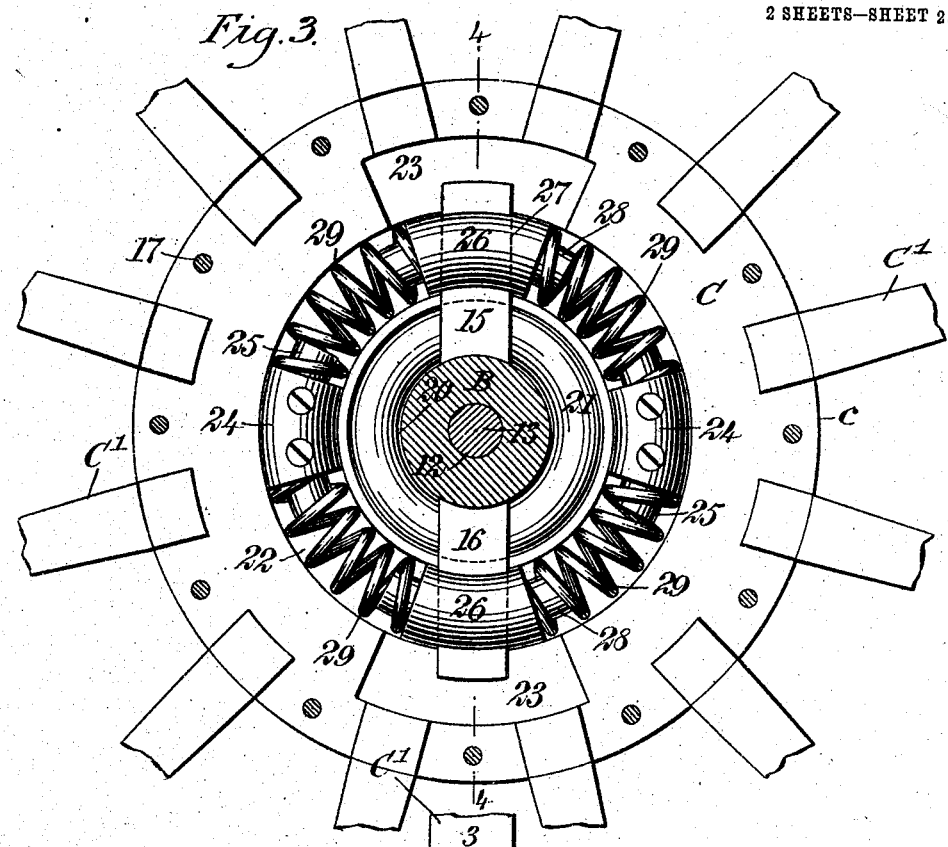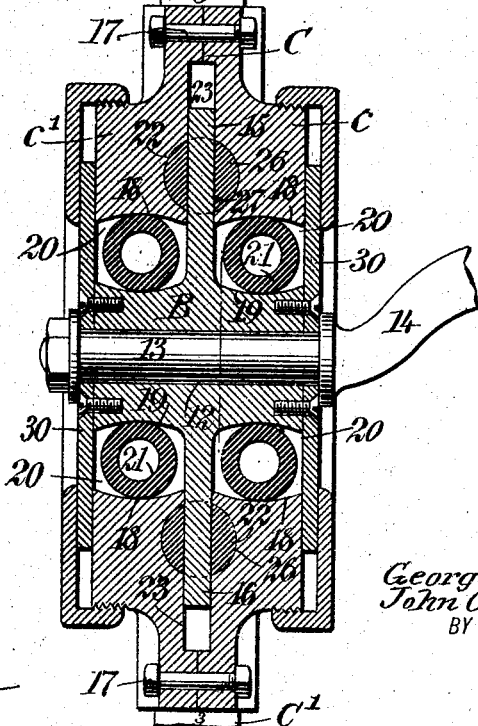

UNITED STATES PATENT OFFICE.

GEORGE L. GLASER, OF NEW YORK, N. Y., AND JOHN OLSEN, OF JERSEY CITY, NEW JERSEY.

VEHICLE-WHEEL.

No. 806,080.  Specification of Letters Patent.  Patented Nov. 28, 1905.

Application filed December 19, 1904. Serial No. 237,442.

*To all whom it may concern:*

Be it known that we, GEORGE L. GLASER, a resident of the city of New York, Elmhurst, borough of Queens, in the county of Queens and State of New York, and JOHN OLSEN, a resident of Jersey City, in the county of Hudson and State of New Jersey, citizens of the United States, have invented a new and Improved Vehicle-Wheel, of which the following is a full, clear, and exact description.

Our invention relates to wheels adapted for cars, automobiles, carriages, or other vehicles; and the purpose of the invention is to provide a wheel which contains in its inner circumference, not in contact with the roadway, an elastic or pneumatic cushion which takes up and diminishes any shock or jar received upon the axle as a result of the wheel rolling over an uneven roadway and which contains a mechanical contrivance of such construction that the driving-hub of the wheel may be instantly displaced from its center when at rest and will as quickly recover its normal center, or, in other words, the hub may assume eccentric centers to which it may be pressed by shock or jar and will instantly and automatically resume its normal center.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a wheel having the improvement applied. Fig. 2 is an enlarged side elevation of the central or hub section of the wheel shown in Fig. 1. Fig. 3 is a section through the hub portion of the wheel, the section being taken practically on the line 3 3 of Fig. 4; and Fig. 4 is a section likewise through the hub of the wheel, taken at right angles to the section shown in Fig. 3 and practically on the line 4 4 of Fig. 3.

The frame structure of the wheel comprises practically four parts—a rim-section A, made up of the rim proper, 10, and the tire 11, an inner hub-section B, an outer hub-section C, independent of the inner hub-section and spaced therefrom, the two hub-sections, however, having action relative to each other, and spokes C', which are secured in any suitable or approved manner in the rim-section A and the outer hub-section C.

The inner hub-section B is provided with the usual bore 12 to receive the spindle 13 of an axle 14, and one or more (preferably two) blades or fins 15 and 16 extend outwardly from diametrically opposite points at the exterior of the said inner hub-section B, as is shown in Figs. 3 and 4. The blades or fins 15 and 16, although shown flat, may be of any cross-sectional shape and are of sufficient length to extend through the space intervening between the two hub-sections B and C and into the outer hub-section C, as is also shown in Figs. 3 and 4.

The outer hub-section C is made in two members $c$ and $c'$ of duplicate construction, the sections being connected near their outer marginal edges by bolts 17 or their equivalents. The inner faces of the members of the outer hub-section C are provided, preferably, with concaved annular surfaces 18, and the inner hub-section B at each side of its fins or blades 15 and 16 is likewise provided with annular concaved surfaces 19. In this manner annular chambers 20 are provided between the two hub-sections B and C, having oppositely-concaved opposing walls, as is particularly shown in Fig. 4, and within each chamber 20 a ring 21, of resilient material, is fitted, as is shown in both Figs. 3 and 4, which rings are usually hollow and are made of rubber; but they may be solid and other yielding or elastic material may be used in their composition.

Annular registering recesses are provided in the inner faces of the members $c$ and $c'$ of the outer hub-section C, forming when said members are brought together an annular centrally-located chamber 22, as is shown in Figs. 3 and 4, and, as is likewise shown in the same figures, the members of the said outer hub-section C are provided with recesses which form opposing pockets 23, said pockets being of segmental shape and of any desired length.

Between the pockets 23 opposing segmental blocks 24 are secured in the chamber 22, the attachment being made in any desired manner, and the blocks 24, which correspond to the circular cross-sectional shape of the said chamber 22, as illustrated in Fig. 3, are provided with end lugs 25. Two opposing segmental blocks 26, corresponding to the blocks 24, are loosely placed in the said chambers 22, the loosely-mounted blocks 26 being between the fixed blocks 24 and are placed opposite each other and opposite the mouth portions of the pockets 23.

The pockets 23 are flat, and their transverse width is just sufficient to permit the fins or blades to slide therein. Each loosely-placed or sliding block 26 is provided with a slot 27, which slots register with the mouth portions of the pockets 23, as is shown in Figs. 3 and 4, and the fins or blades 15 and 16 from the inner hub-section B are passed snugly through the said slots 27 into the pockets 23; but the projecting portions of the fins or blades 15 and 16 stop short of the outer longitudinal walls of the block. Each sliding pocket 26 is provided with a lug 28 at each end, and springs 29 are connected with the end portions of the fixed and the sliding blocks through the medium of the lugs at their end portions, the springs employed being preferably spiral springs, as illustrated, and of sufficient diameter to fit quite snugly in the chamber 22, yet have more or less movement therein.

In completing the construction of the wheel the parts above described having been assembled in the order named a face-plate 30 is secured to each outer end of the inner hub-section B, the face-plate 30 being of circular formation and apertured for the passage of the axle-spindle 13, and after the face-plates 30 are secured in place on the inner hub-section a cap-band 31 is secured upon each outer edge of the outer hub member C, as is particularly shown in Fig. 4, and these cap-bands 31 partially cover the face-plates 30; but those portions of the face-plates through which the axle-spindle extends are exposed by reason of the cap-plates 31 having a central opening 32 produced therein. Thus when the parts of the wheel are assembled it is neat and differs but slightly in appearance from that of an ordinary wheel. Furthermore, it is obvious that the arrangement of the face-plates and the cap-bands 31 effectually prevent dust from entering the wearing portions of the wheel.

The rings 21 are practically cushions and may be inflated. The springs 29 and the sliding blocks serve as another cushion, and the two sections of the hub while mechanically independent have a cushion connection which causes them to move under certain conditions of shock independently and yieldingly and under general conditions together, but with such cushion action that it renders the use of a cushion-tire unnecessary, though if such is used the cushion effect is greatly augmented. It will be observed that the outer hub-section C constitutes an inner rim for the wheel and that the inner hub-section B is a driving-section.

The particular feature of the invention consists in placing an annular elastic cushion within the inner rim not in contact with the roadway and which surrounds the driving-hub, which hub by mechanical devices or contrivances is enabled to assume eccentric centers, which eccentric movement of the driving-hub permits of the taking up of shock or jar, which rapidly diminishes within the hub by the presentation of rapidly-moving points of contact against an elastic cushion or pneumatic annular ring or air-container. It is further claimed that a wheel constructed in the manner described will present to the road-surface a greater surface of friction to the roadway than ordinarily on account of the ability of the hub to assume eccentric centers and in that way prevent a large amount of slipping.

Having thus described our invention, we claim as new and desire to secure by Letters Patent—

1. In a vehicle-wheel hub, an outer rim having a chamber, an inner rim provided with projections extending into the chamber of the outer rim, a cushion between the rims, and a cushion in the chamber of the outer rim and engaging the projection of the inner rim.

2. In a vehicle-wheel hub, an outer rim having a chamber and a pocket exterior to the chamber, an inner rim provided with a projection extending into the pocket of the outer rim, a cushion between the rims, and a cushion in the chamber of the outer rim and engaging the projection of the inner rim.

3. In a vehicle-wheel hub, an outer rim provided with an annular chamber and oppositely-arranged pockets exterior to the chamber, an inner rim provided with a plurality of projections having their ends extending into the said pockets, a cushion between the rims, and cushions in the annular chamber of the outer rim and engaging the projections of the inner rim.

4. In a vehicle-wheel hub, an inner rim having projections, an outer rim, a cushion between the rims, and loose spring-pressed blocks mounted in the outer rim with which the projections on the inner rim engage.

5. In a vehicle-wheel hub, an inner rim having projections, an outer rim having an annular groove and pockets exterior of the groove, a cushion between the rims and loose spring-pressed blocks in the groove, said blocks being apertured, the projections of the inner rim extending through the apertures of the blocks into the pockets.

6. In a vehicle-wheel hub, an inner rim having oppositely-arranged projections, an outer rim having an annular groove and segment-shaped pockets, a cushion between the rims stationary blocks held in the groove, loose segmental blocks between the first-named blocks provided with openings through which the projections of the inner rim extend into the said pockets, and springs arranged between the said blocks.

7. In a vehicle-wheel hub, an inner rim having radial fins, an outer rim having an annular groove and pockets exterior to the groove, loose segmental blocks in the groove opposite the mouths of the pockets, said blocks being provided with apertures through which the fins of the inner rim project into the pockets, springs between the said blocks, and cushions between the rims.

In testimony whereof we have signed our names to this specification in the presence of two subscribing witnesses.

GEORGE L. GLASER.
JOHN OLSEN.

Witnesses:
ROCCO J. GALLUCCI,
ADAM GLASER.